United States Patent

Sadano et al.

[11] Patent Number: 5,082,167
[45] Date of Patent: Jan. 21, 1992

[54] METHOD OF SOLDERING HONEYCOMB BODY

[75] Inventors: Yutaka Sadano; Yuuji Nakashima, both of Kimitsu; Takashi Tanaka, Sagamihara; Takatoshi Kawasaki, Tokyo; Shinji Shibata, Toyota; Hikaru Aoyagi, Tokyo; Yoshio Nishizawa, Tokyo; Akihiko Kasahara, Tokyo, all of Japan

[73] Assignees: Nippon Steel Corporation, Tokyo; Toyota Jidosha Kabushiki Kaisha, Toyota; Nippon Kinzoku Co., Ltd., Tokyo, all of Japan

[21] Appl. No.: 583,331

[22] Filed: Sep. 17, 1990

[51] Int. Cl.⁵ .................................. B23P 13/00
[52] U.S. Cl. ..................................... 228/258; 228/181
[58] Field of Search ............. 228/258, 181, 248 M, 228/215

[56] References Cited

U.S. PATENT DOCUMENTS

| | | | |
|---|---|---|---|
| 1,730,470 | 10/1929 | Modine | 228/258 |
| 3,139,676 | 7/1964 | Saj | 228/181 |
| 3,656,224 | 4/1972 | Blair et al. | 228/181 |
| 3,797,087 | 3/1974 | Allardyce et al. | 29/157.3 |
| 4,381,390 | 4/1983 | Schmidt et al. | 528/167 |
| 4,521,947 | 6/1985 | Nonnenmann et al. | 29/157 R |

FOREIGN PATENT DOCUMENTS

| | | | |
|---|---|---|---|
| 2557616 | 2/1986 | France. | |
| 48-18141 | 3/1973 | Japan. | |
| 0068751 | 6/1979 | Japan | 228/248 |
| 0010326 | 1/1980 | Japan | 228/248 |
| 61-199574 | 9/1986 | Japan. | |
| 1452982 | 10/1976 | United Kingdom. | |
| 2051624 | 1/1981 | United Kingdom. | |

*Primary Examiner*—Richard K. Seidel
*Assistant Examiner*—James Miner
*Attorney, Agent, or Firm*—Cushman, Darby & Cushman

[57] ABSTRACT

When soldering a honeycomb body formed by alternately piling flat foils (plates) and corrugated foils (plates), a binder liquid is sucked up from the end face of the honeycomb body to form a binder streak in a space defined by contacting portions of the flat foil (plate) and corrugated foil (plate), a solder is scattered and applied onto the binder streak, and the honeycomb body is then dried and heated to effect a soldering of the honeycomb body. According to this method, soldering can be accomplished only in the vicinity of the contacting portions of the flat foil (plate) and corrugated foil (plate), with a desired soldering structure.

9 Claims, 10 Drawing Sheets

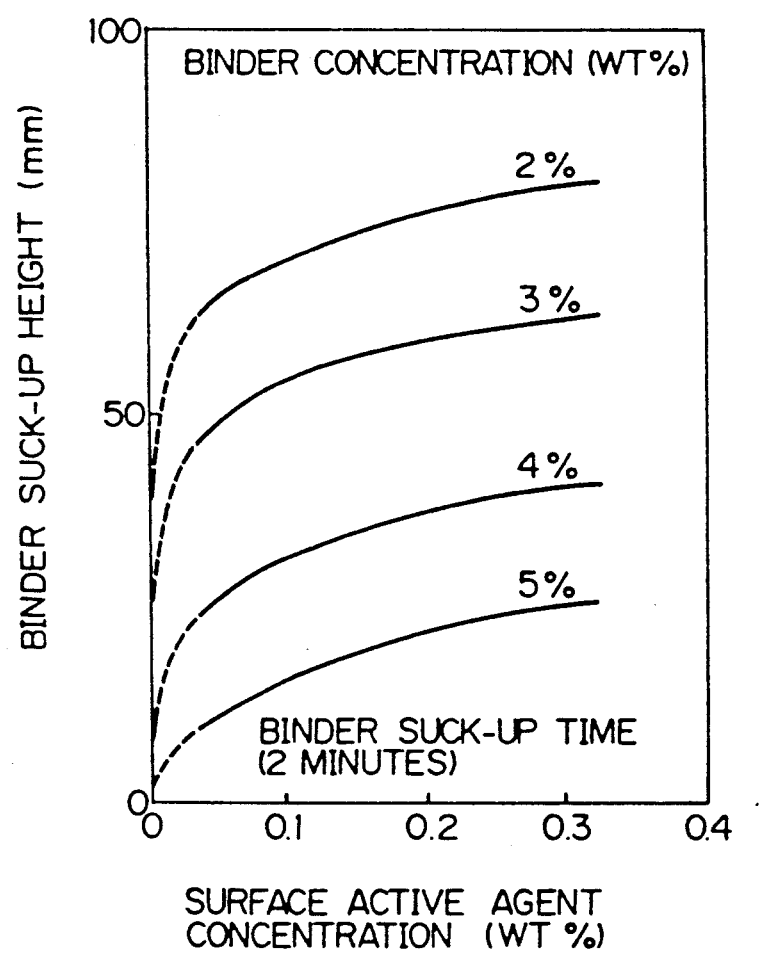

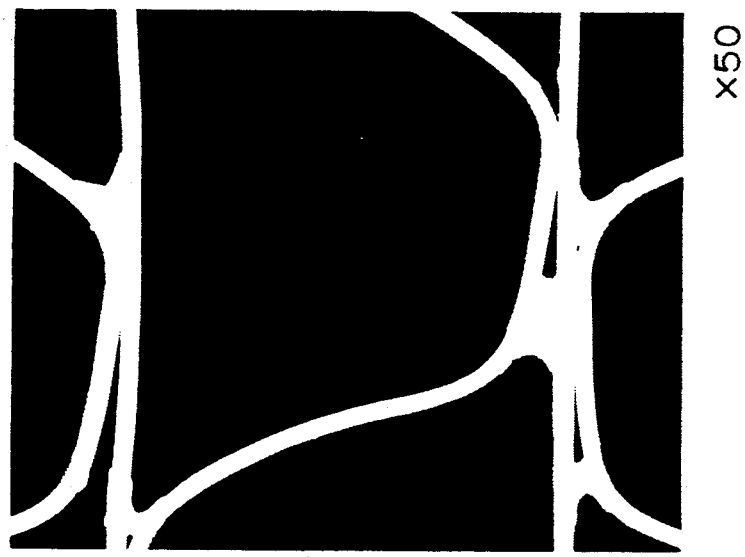
Fig. 10(b) ×50
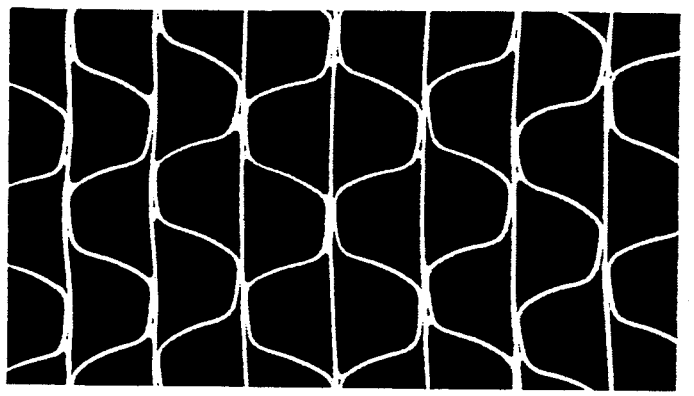
Fig. 10(a) ×10

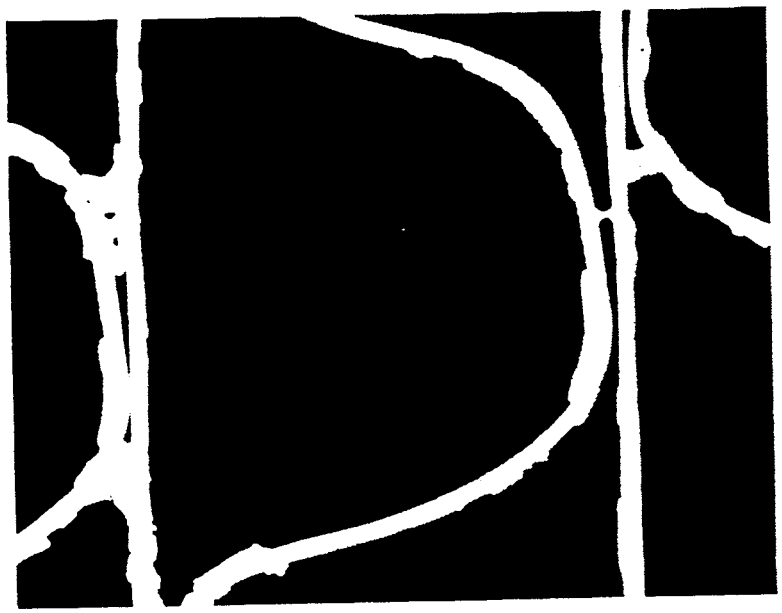
Fig. 11(b) ×50
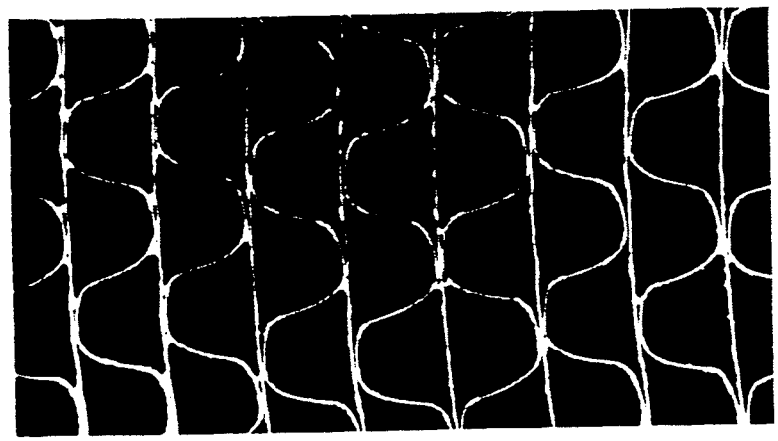
Fig. 11(a) ×10

METHOD OF SOLDERING HONEYCOMB BODY

BACKGROUND OF THE INVENTION

(1) Field of the Invention

The present invention relates to an improvement of the soldering technique adopted in the production of a honeycomb body assembled by soldering a metal foil or metal sheet. More particularly, the present invention relates to a method of effectively coating a solder on a portion to be bonded of a honeycomb body in the production of a plate-fin heat exchanger or a metal carrier for a catalyst for purging an exhaust gas from an automobile engine or the like.

(2) Description of the Related Art

A radiator or plate-fin heat exchanger is constructed by a honeycomb structure body (hereinafter referred to as "honeycomb body") formed by piling flat plates and corrugated plates in the form of layers and soldering the plates to one another. The supply of a solder to this honeycomb body is generally accomplished by alternatively piling flat plates and corrugated plates having both surfaces spray-coated with a powdery solder, or by inserting a solder foil between every two adjacent flat and corrugated plates and piling the plates.

A metal carrier for a catalyst for purging an exhaust gas is constructed by a honeycomb body formed by alternately winding or laminating flat metal foils (hereinafter referred to as "flat foils") and corrugated metal foils (hereinafter referred to as "corrugated foils"). As the method of soldering this honeycomb body, there is known a method in which a portion close to the end face of the honeycomb body (hereinafter referred to as "end face portion") is immersed in a binder liquid, a powdery solder is scattered in the interior of the honeycomb body from the end face of the end face portion, the solder is applied to the end face portion immersed in the binder liquid, and the soldering is carried out (see Japanese Unexamined Patent Publication No. 61-199574).

According to this conventional solder-supplying method, however, it is difficult to uniformly supply a necessary amount of a solder only to the portion to be bonded of the honeycomb body, i.e., the portion defined by the apex of the corrugated foil (plate) and the flat foil (plate), and the following problems arise.

(1) Since the solder is supplied also to a portion not to be bonded, the amount of solder used is increased. Moreover, since the total amount of the solder is increased, components of the solder are diffused into the metal foil and corrosion or contraction often occur.

Namely, if the end face portion of the honeycomb body is immersed in the binder liquid, as is taught in the above-mentioned patent publication, the binder adheres to a portion other than the contacting portions of the flat foil and corrugated foil, i.e., the surfaces of the flat foil and corrugated foil, and therefore, the solder also adheres to this portion and the above-mentioned problem arises.

(2) Where the solder is first supplied to at least one of the flat and corrugated plates, flat plates and corrugated plates are alternately piled in the form of layers, and are wound to form a honeycomb body, and subsequently the honeycomb body is soldered. Because, however, the solder is inserted between the flat and corrugated plates, the apparent thickness of the honeycomb body is increased, it is difficult to precisely estimate, before the soldering, the thickness after soldering, and to adjust the thickness accordingly.

(3) Where a cylindrical honeycomb body is prepared by supplying a solder to at least one of the flat and corrugated plates and piling and spirally winding these plates, a space formed after the melting of the solder at the soldering step cannot be eliminated, and therefore, the method in which the solder is inserted between the flat and corrugated plates cannot be adopted. For this reason, the solder must be supplied to the portion to be bonded after the corrugated and flat plates have been piled and spirally wound, and therefore, according to the conventional solder-supplying method, it is difficult to supply a necessary amount of the solder only to the vicinity of the portion to be bonded.

(4) As the means for supplying a solder precisely to the vicinity of a portion to be bonded, there can be mentioned the dispensing system in which a mixture of a gelatinous binder and a powdery solder is extruded little by little from a fine nozzle. According to this system, however, since the nozzle is manually operated, the operation efficiency is low when the mixture is supplied to many bonding points, as in case of bonding a honeycomb body, and it is often impossible to bring the nozzle close to the bonding points.

SUMMARY OF THE INVENTION

Under the above-mentioned background, the object of the present invention is to solve the foregoing problems. Therefore, a primary object of the present invention is to provide a method of uniformly supplying a necessary amount of a solder only to the vicinity of a point of contact between a flat plate (foil) and a corrugated plate (foil) in a honeycomb body.

Another object of the present invention is to provide a method in which a portion to be soldered is set at a desired position.

Still another object of the present invention is to provide a method in which a binder liquid to be used for the soldering is sucked up at a high efficiency.

A further object of the present invention is to provide a method in which a necessary amount of a solder is conveniently supplied at a low cost.

The means for attaining these objects will now be described in detail.

The present invention is characterized in that a binder liquid is sucked up, in the form of streaks, into spaces defined by contacting portions of flat foils (plates) and corrugated foils (plates) of a honeycomb body, by utilizing a capillary phenomenon, and a solder is caused to adhere to these streaks of the binder liquid. More specifically, the end face of the honeycomb body is brought into contact with the surface of the binder liquid, the binder liquid is sucked up into the above-mentioned space defined by the contacting portions, a powdery solder is scattered in the vicinity of the contacting portions and caused to adhere thereto, and the binder liquid is then dried and the solder-applied honeycomb body charged in a soldering furnace and heated to effect soldering.

Furthermore, the present invention is characterized in that, when the above-mentioned honeycomb body is fabricated, a solid or liquid material for blocking the rise of the binder liquid is coated along a predetermined width at a predetermined position of the contacting portions of the flat foil (plate) and corrugated foil (plate). According to this method, a desired soldered structure of the honeycomb body can be produced because the binder liquid has been sucked up to the predetermined position.

BRIEF DESCRIPTION OF THE DRAWINGS

FIG. 8 is a graph illustrating the relationship between the surface active agent concentration at each of the binder liquid concentration and the binder liquid suck-up height.

FIG. 10-(a) is a photo (10 magnifications) of the section of a part of the honeycomb body after the soldering treatment of the present invention, and FIG. 10-(b) is an enlarged photo (50 magnifications) of the part shown in FIG. 10-(a);

FIG. 11-(a) is a photo (10 magnifications) of the section of a part of the honeycomb body after the soldering treatment of the comparative example, and FIG. 11-(b) is an enlarged photo (50 magnifications) of the part shown in FIG. 11-(a); and, FIGS. 12-(a) through 12-(c) are sectional diagrams showing other modes of the soldering state in the honeycomb body of the present invention.

DESCRIPTION OF THE PREFERRED EMBODIMENTS

The present invention will now be described with reference to embodiments wherein metal foils are used, but the present invention is not limited to the use of metal foils.

In the method of supplying a binder to a honeycomb body according to the present invention, a binder liquid is sucked up to a space defined by the contacting portions of a corrugated foil and a flat foil, utilizing a capillary phenomenon.

More specifically, at the end face portion of the honeycomb body, the honeycomb face defined by corrugated and flat foils is exposed, and therefore, by bringing this end face portion of the honeycomb body into contact with the surface of the binder liquid, the binder liquid is sucked up only into the above-mentioned space. Since the capillary phenomenon is thus utilized in the present invention, the binder does not adhere to any portion other than that in the vicinity of the contacting portions of the flat and corrugated foils.

According to a preferred embodiment of the present invention, the end face of the honeycomb body is placed on a suck-up substrate member, such as a sponge, which is immersed in a binder liquid tank so that the upper surface of the suck-up substrate member is exposed. In this embodiment, the sponge sucks up the binder liquid, and the level of the binder liquid rises to the top surface of the sponge. Accordingly, only the end face of the honeycomb body can be brought into contact with the binder liquid, without immersing the end face portion of the honeycomb body in the binder liquid, and as a result, the binder liquid can be sucked up only into the space defined by the contacting portions of the honeycomb body.

Figure 1:
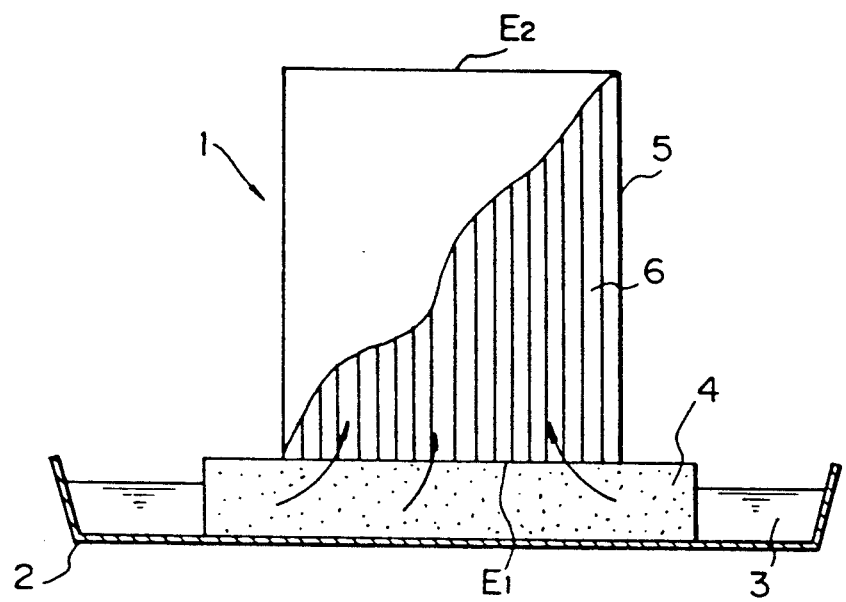
FIG. 1 is a partially sectional diagram illustrating an embodiment of the present invention.
Figure 2:
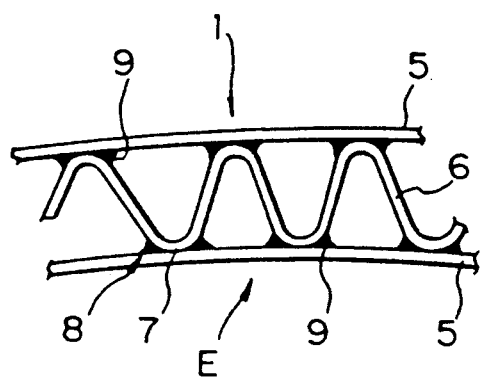
FIG. 2 is a partial view showing in detail a point of contact between a corrugated foil (plate) and a flat foil (plate) in the honeycomb body of the present invention.

This embodiment will now be described with reference to the accompanying drawings. Referring to FIG. 1, a sponge 4 is immersed in a binder liquid 3 stored in a binder tank 2, so that the top face of the sponge 4 is exposed, and when the binder liquid 3 has sufficiently permeated the sponge 4, the honeycomb body 1 is placed on the sponge 4 so that the end face $E_1$ of the honeycomb body 1 is brought into contact with the top face of the sponge 4. As shown in FIG. 2, the end face $E_1$ of the honeycomb 1 is constructed by a combination of a flat foil 5 and a corrugated foil 6, and a space 8 is formed by contacting portions 7 therebetween. The binder liquid 3 is sucked up into this space 8, and the binder liquid 3 rises to the limit of the surface tension of the binder liquid to form streaks 9 of the binder.

The binder liquid suck-up characteristic experiments will now be described. First, a honeycomb body is prepared in the following manner. For the preliminary treatment, a rolled stainless steel foil is subjected to an alkali treatment to remove rolling oil adhering to the foil, and flat foils and corrugated foils of this stainless steel foil are piled and wound to form a cylindrical honeycomb body having a diameter of 19 mm and a height of 97 mm. The thickness of each foil is 50 μ. The binder liquid suck-up characteristics of the space defined by the contacting portions of the flat and corrugated foils in this honeycomb body will now be described with reference to FIGS. 6 through 8. An aqueous solution of polyvinyl alcohol (hereinafter referred to as "PVA") is used as the binder liquid.

Figure 6:
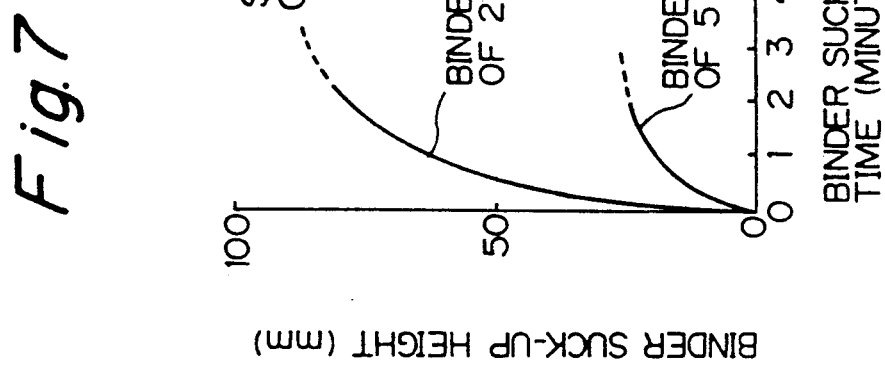
FIG. 6 is a graph illustrating the relationship between the binder concentration and the binder suck-up height.

FIG. 6 illustrates the relationship between the binder liquid concentration and the binder liquid suck-up height. Two surface active agent concentrations, 0.27% by weight and 0.03% by weight, are adopted. For example, the surface active agent contains an anionic surface active agent, such as sodium alkyl-sulfate or sodium alkylbenzene-sulfonate, or an ethylene oxide adduct of a higher alcohol or alkyl phenol, such as an alkyl phenol/ethylene oxide condensate. The results obtained after a lapse of 2 minutes from the point at which the honeycomb body is set on the sponge are shown in FIG.

6, and it is seen that, as the binder concentration is increased, the suck-up height is rapidly reduced.

Figure 7:
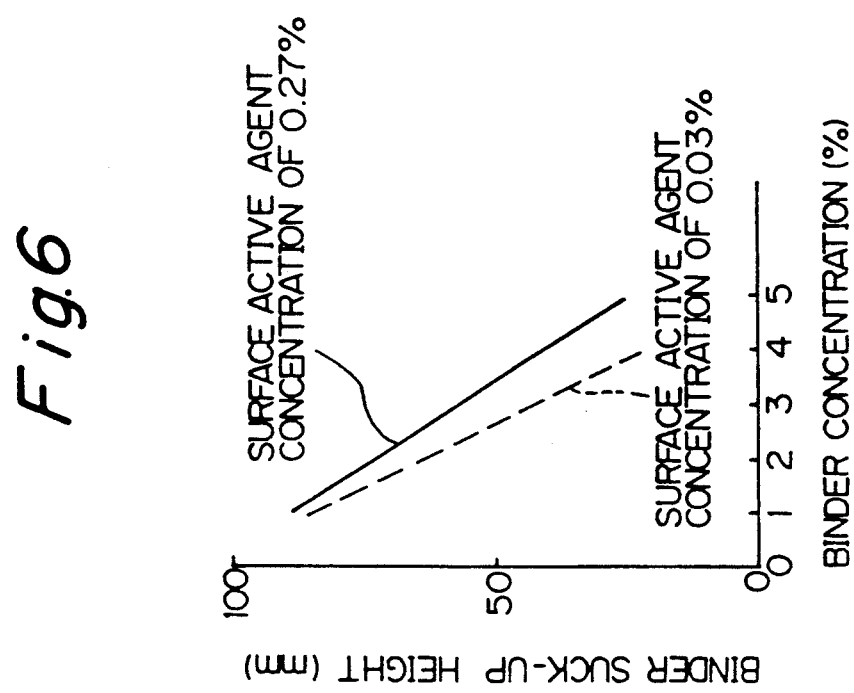
FIG. 7 is a graph illustrating the relationship between the binder suck-up time and the binder suck-up height.
Figure 9A:
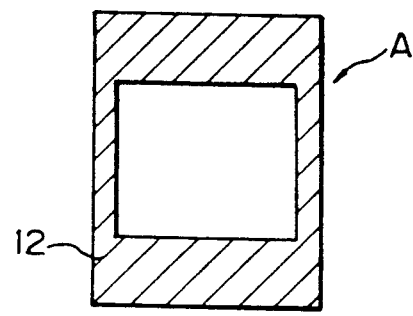
FIG. 9-(a) is a sectional diagram illustrating the soldered state of the honeycomb body of the present invention, in which flat and corrugated foils in both end face portions of the honeycomb body are soldered, and flat and corrugated foils at a part (peripheral part) of the intermediate portion of the honeycomb body are soldered, FIG. 9-(b) is a partially sectional front view showing the binder suck-up state of the periphery of the honeycomb body in one embodiment of the method of sucking up a binder liquid according to the present invention, FIG. 9-(c) is a partially sectional front view showing the binder suck-up state at the end portion of the honeycomb body, FIG. 9-(d) is a sectional diagram illustrating the state wherein a material for blocking the rise of a binder liquid is coated in the interior of the honeycomb body in another embodiment of the method for sucking up a binder liquid according to the present invention, and FIG. 9-(e) is a partially sectional front view showing the binder suck-up state in the honeycomb body shown in FIG. 9-(d)
Figures 9B, 9C:
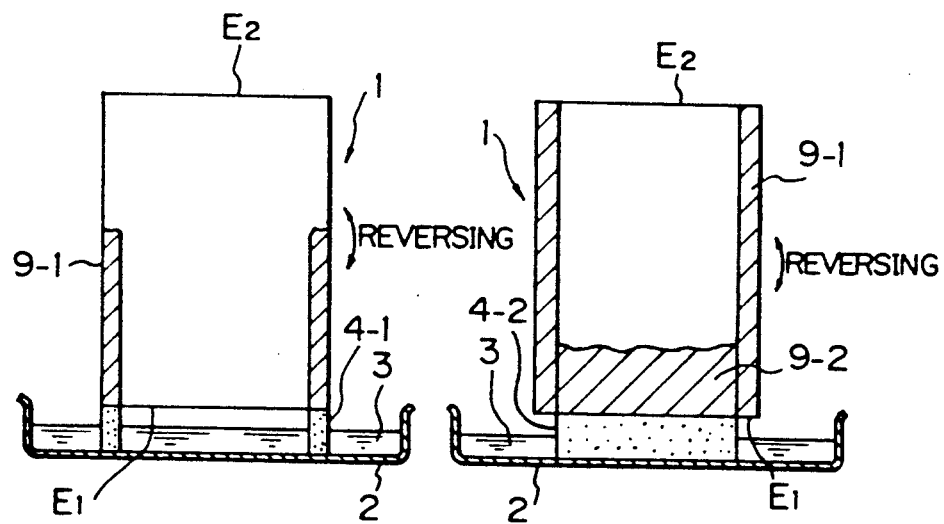
Figure 9D:
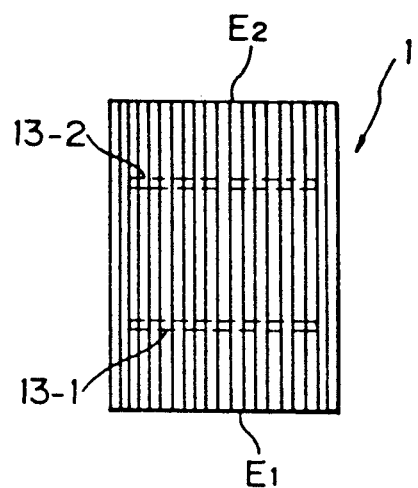
Figure 9E:
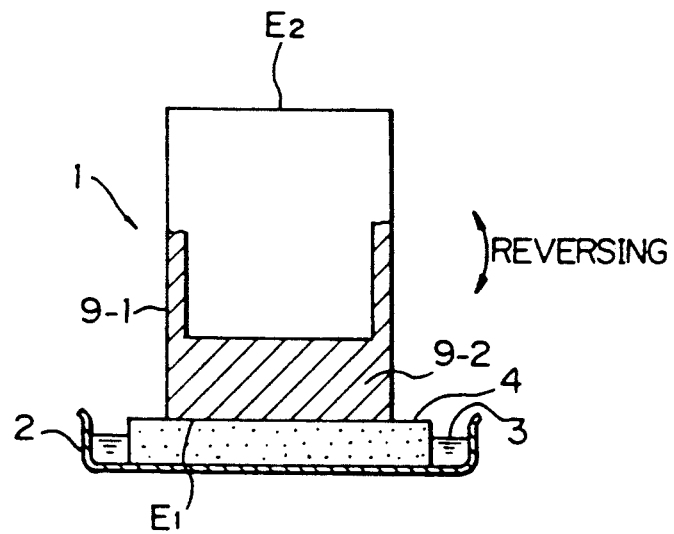

FIG. 7 shows the relationship between the binder liquid suck-up time and the binder liquid suck-up height, observed when the binder liquid concentration is adjusted to 2% and 5% (the surface active agent is adjusted to 0.27% by weight), and it is seen that, if the binder liquid concentration is reduced by about ½, the suck-up height is doubled.

FIG. 8 illustrates the relationship between the concentration of the surface active agent to be added to the binder liquid and the binder liquid suck-up height, observed when the binder liquid concentration is adjusted to 2 through 5%, and it is seen that the suck-up height can be also controlled by the concentration of the surface active agent (the binder liquid suck-up time was 2 minutes).

From the foregoing experimental results, it is understood that a desired binder liquid suck-up height can be obtained by appropriately adjusting the binder liquid concentration, the surface active agent concentration, and the binder liquid suck-up time.

Figure 3:
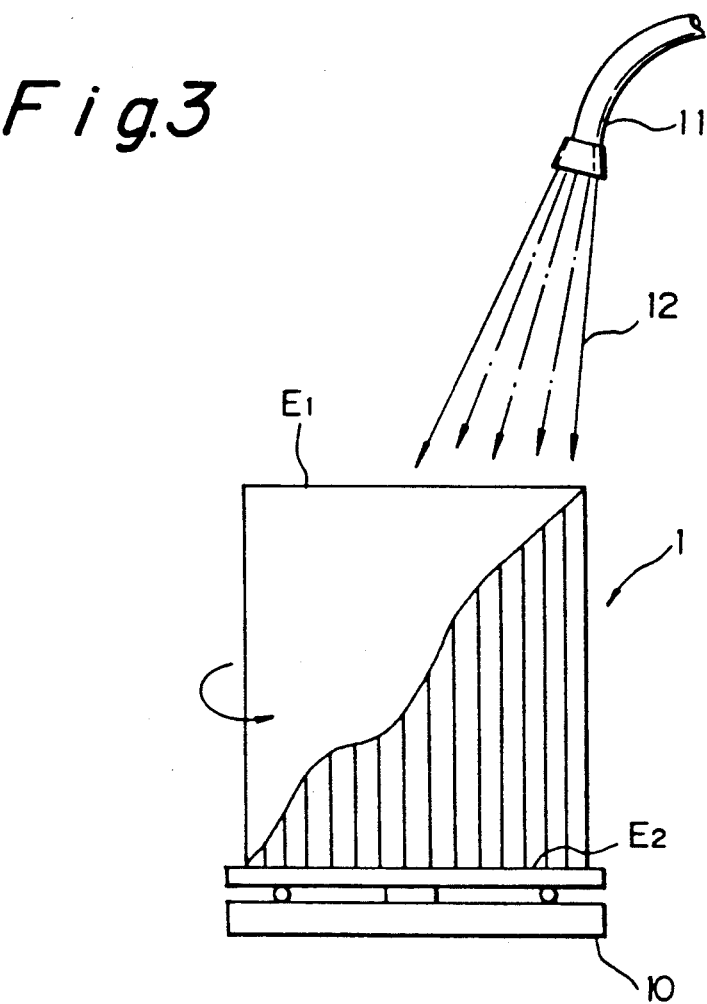
FIG. 3 is a diagram illustrating the scattered state of a solder.
Figure 4:
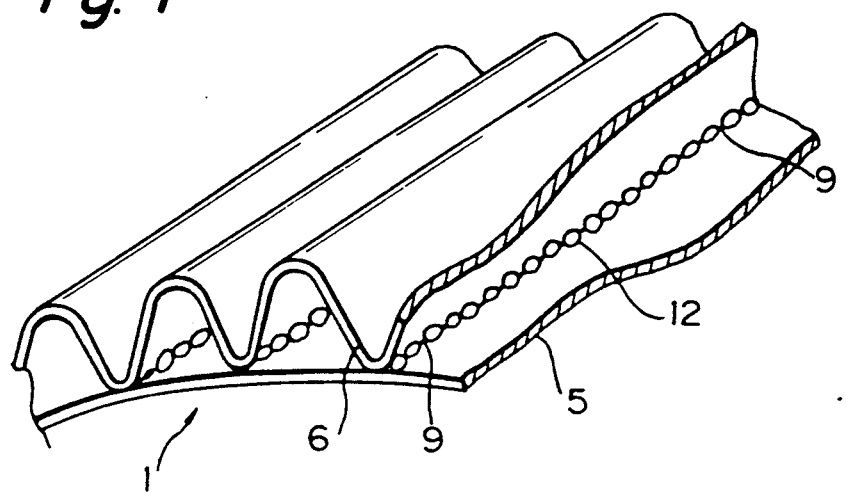
FIG. 4 is a partially enlarged perspective view illustrating the state in which a solder is adhered to streaks of a binder liquid.

After binder streaks having a desired height have been thus formed, as shown in FIG. 3, the honeycomb body 1 is placed on a rotary stand 10 so that the end face $E_1$ is located thereabove, and while the honeycomb body 1 is rotated, a powdery solder 12 is scattered from a nozzle 11 and caused to uniformly adhere to the vicinity of the contacting portions of the honeycomb body. The adhered state of the solder 12 is shown in FIG. 4. The binder adhered in the space defined by the contacting portion of the honeycomb body is present in the form of a continuous streak, as indicated by reference numeral 9, and the powdery solder 12 is uniformly adhered to this streak of the binder. After the solder is scattered, the honeycomb body 1 is dried to evaporate water from the binder streak, and then the honeycomb body 1 is charged in a soldering furnace and heated. By the foregoing operations, the honeycomb body is tightly soldered only in the vicinity of the contacting portions.

Figure 5A:
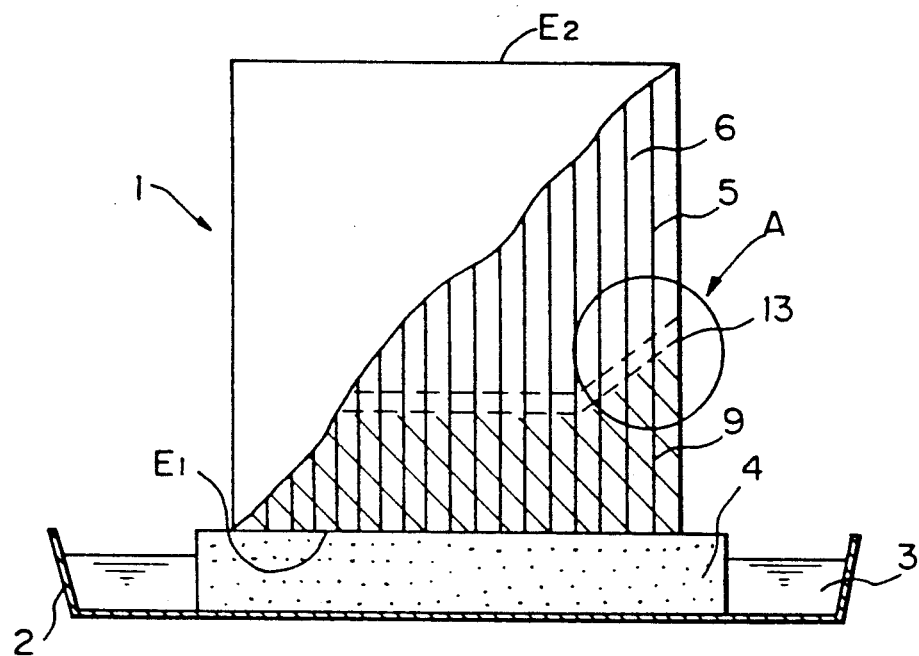
FIG. 5 illustrates another embodiment of the present invention, in which FIG. 5-(a) is a partially sectional front view and FIG. 5-(b) is an enlarged view showing a portion A.
Figure 5B:
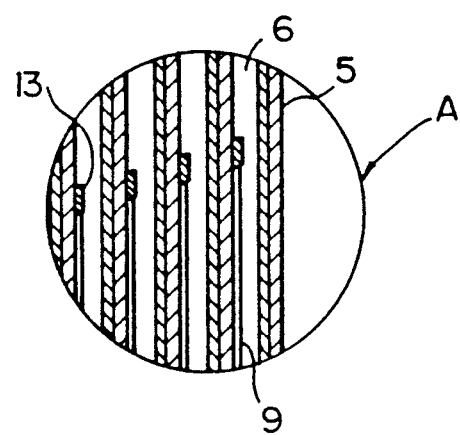

An embodiment wherein soldering is effected at a desired position in the honeycomb body will now be described. Referring to FIGS. 5-(a) and 5-(b), a rise-blocking material 13 such as a solid paraffin or oil and fat is coated in the form of a streak at a desired position on the flat foil 5 or corrugated foil 6 before winding these foils, and the foils are wound together with the rise-blocking material to form a honeycomb body. Then the end face $E_1$ of the honeycomb body is placed on the sponge 4 immersed in the binder liquid 3, and the binder liquid 3 is caused to rise into the space defined by the contacting portions of the honeycomb body, by the capillary phenomenon, but the rise is blocked at the position where the blocking material 13 is coated. Accordingly, the binder streak 9 is formed between the end face of the honeycomb body and the blocking material-coated position. When the solder is scattered on this honeycomb body, as shown in FIG. 3, the solder adheres only to the binder streak 9, and therefore, the solder-applying portion can be restricted to a desired region.

EXAMPLES

The method of preparing a soldered honeycomb body A shown in FIG. 9-(a) will now be described.

FIG. 9-(a) is a sectional diagram illustrating the soldered structure of the honeycomb body. The state wherein the hatched contacting portion between the flat and corrugated foils is soldered (12), and the other portion is not soldered is illustrated. More specifically, by soldering only both end face portions of the honeycomb body and the vicinity of the periphery of the honeycomb body, the heat resistance characteristics (such as heat fatigue resistance and heat-resistant strength) are increased, and if this honeycomb body is used as a carrier for an automobile exhaust gas-purging catalyst, the intended effects can be efficiently and advantageously attained.

The steps of preparing this soldered honeycomb body A will now be described. The pretreatment and the thickness of the foils and the dimension of the honeycomb body 1 is almost the same used in the above-mentioned binder liquid suck-up characteristic experiments (FIGS. 6 through 8). Referring to FIG. 9-(b), a sponge 4-1 on which the honeycomb body 1 is placed is immersed in a binder liquid in a binder tank 2. This sponge 4-1 is formed to have an annular shape having a width corresponding to the peripheral portion of the honeycomb body, which has a desired number of layers, for example, 2 or 3 layers, from the outermost layer toward the center.

The honeycomb body 1 is placed on this annular sponge 4-1, and the binder liquid is sucked up from the end face $E_1$ of the honeycomb body into the peripheral portion of the honeycomb body, for 2 minutes, and is caused to rise in the honeycomb body, whereby a binder streak 9-1 having a height of about 65 mm is formed. Then the honeycomb body 1 is reversed, and the binder liquid 3 is sucked up from the end face $E_2$ for 2 minutes, whereby the binder 9-1 is formed over the entire region of the peripheral portion. The binder liquid used is formed by adding 0.05% of a surface active agent to a 2% aqueous solution of PVA.

Then, as shown in FIG. 9-(c), a columnar sponge 4-2 having an outer periphery tangential at least to the annular inner face of the annular sponge 4-1 is immersed in the binder liquid 3, the honeycomb body 1 is placed on the sponge 4-2, and the binder liquid 3 is sucked up from the end face $E_1$ toward the end face of the honeycomb body for 2 minutes, to cause the binder liquid to rise, whereby a binder streak 9-2 having a desired height of 25 mm is formed in the space defined by the contacting portions of the flat and corrugated foils at the end face portion. Then the honeycomb body is reversed and the binder liquid 3 is sucked up from the end face $E_2$ for 2 minutes, to form a binder streak 9-2 at both end face portions of the honeycomb body. The binder liquid used is formed by adding 0.03% of a surface active agent to a 4% aqueous solution of PVA. In this binder liquid, the suck-up rising speed is controlled to a level lower than the speed adopted for the peripheral portion. As the binder liquid suck-up substrate member, there can be mentioned a sponge having a thickness of about 10 mm, a brush hair-implanted sponge, and a felt having a thickness of about 15 mm.

Another embodiment of the method of sucking up the binder liquid is illustrated in FIGS. 9-(d) and 9-(e). FIG. 9-(d) is a sectional diagram of the honeycomb body 1, and illustrates the state wherein a solid paraffin as the binder liquid rise-blocking material is coated at a thickness of 0.1 $\mu$ along a width of 5 mm at parts 13-1 and 13-2 on both surfaces of the flat foil at the boundary thereof distant by desired lengths from the end faces $E_1$ and $E_2$ of the honeycomb body. Note, the solid paraffin is not coated at a corresponding part of the peripheral portion. As shown in FIG. 9-(e), the honeycomb body 1 is placed on a sponge 4 immersed in a binder liquid 3, and the binder liquid is sucked up from the entire end face $E_1$ for 2 minutes, to cause the binder liquid to rise. As in the embodiment shown in FIG. 9-(a), the binder liquid forms a streak 9-1 in the peripheral portion, but in the end face portion, the rise of the binder liquid beyond a certain height is blocked by the coated solid paraffin at the end face portion, and accordingly, binder streaks 9-1 and 9-2 as shown in FIG. 9-(e) are formed. Then the honeycomb body is reversed and the binder liquid is sucked up from the end face $E_2$ for 2 minutes, and thus binder streaks 9-1 and 9-2 are formed on both end face portions and peripheral portion of the honeycomb body. Note, in the present embodiment, the binder liquid level is controlled by adjusting the supply of the binder liquid so that a distance of about 5 to 6 mm is always maintained between the honeycomb body-placing face of the sponge 4 and the level of the binder liquid 3.

The honeycomb body is then placed on a rotary stand 10, and a solder is scattered on the honeycomb body while rotating the honeycomb body, whereby the solder (powder) is caused to adhere to the binder streaks 9-1 and 9-2. Then the honeycomb body is dried, charged in a soldering furnace, and heated to prepare a soldered honeycomb body A shown in FIG. 9-(a). The soldering state in the soldered honeycomb body A shown in FIG. 9-(a), prepared according to the method shown in FIGS. 9-(d) and 9-(e), is shown in FIGS. 10-(a) and 10-(b). FIG. 10-(a) is a photo (10 magnifications) of the soldering state of the end face portion close to the end face $E_1$ of the honeycomb body A, and FIG. 10-(b) is a photo (50 magnifications) showing the same part as shown in FIG. 10-(a). These photos clearly show that the solder is not fusion-bonded to any portion other than the contacting portions of the flat and corrugated foils.

A comparative example will now be described. Flat and corrugated foils, which have not been subjected to a preliminary treatment, are piled and wound to form a honeycomb body, and the honeycomb body is washed in acetone under ultrasonic vibration. The end face portion of the honeycomb body is immersed to a depth of 20 mm for 20 seconds in a 2% aqueous solution of PVA free of a surface active agent as the binder liquid. The end face portion is taken out of the binder liquid, and air is blown onto the honeycomb body. Then a solder is scattered and applied to the honeycomb body, and the honeycomb body is dried and heated to form a soldered honeycomb body. The obtained honeycomb body is shown in the photos of FIGS. 11-(a) and 11-(b). As seen from these photos, in the honeycomb body of this comparative example, a large quantity of the solder is fusion-bonded even at portions other than the space defined by the contacting portions of the flat and corrugated foils.

Figure 12A:
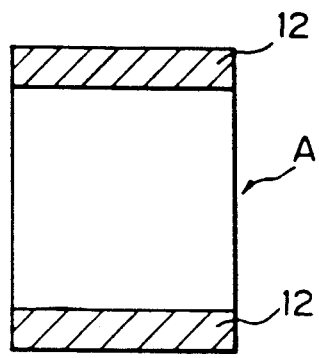
Figure 12B:
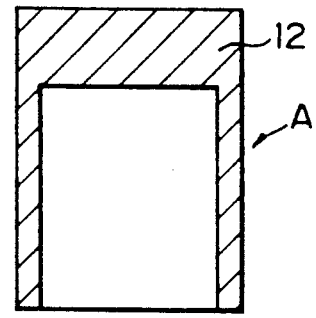
Figure 12C:
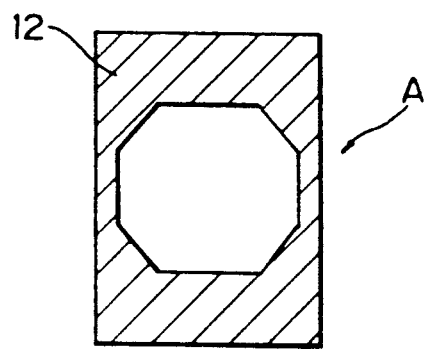

According to the method of the present invention, in addition to the soldered honeycomb body A shown in FIG. 9-(a), there can be produced, for example, a soldered honeycomb body A having a structure as shown in FIGS. 12-(a) through 12-(c). Namely, in the present invention, since the binder is supplied from the end face of the honeycomb body, any soldering structure can be realized, as long as the soldering region is continuous from the end face of the honeycomb body.

We claim:

1. A method of soldering a honeycomb body, which comprises:
   alternately piling and winding or laminating flat foils and corrugated foils to form a honeycomb body,
   connecting the flat and corrugated foils by soldering contacting portions of the flat and corrugated foils,
   immersing a binder liquid suck-up substrate member in the binder liquid so that the top face is exposed,
   placing the honeycomb body on the suck-up substrate member to bring the end of the honeycomb body into contact with the top face of the suck-up substrate member to cause the binder liquid to rise along spaces defined by the contacting portions and to form binder streaks,
   scattering and applying a solder to the binder streaks, and
   drying and heating the honeycomb body.

2. A method according to claim 1, including adjusting the height of the binder streaks by adjusting the concentration of the binder liquid.

3. A method according to claim 1 or 2 including adjusting the height of the binder streaks by adjusting the concentration of a surface active agent added to the binder liquid.

4. A method according to claim 1, including adjusting the height of the binder streaks by the time for which the honeycomb body is placed on the binder suck-up substrate member.

5. A method according to claim 1, wherein the binder suck-up substrate member is a sponge or felt.

6. A method according to claim 1, wherein said placing includes placing the honeycomb body on a suck-up substrate member having a cylindrical shape to form binder streaks on the peripheral portion of the honeycomb body and on a columnar suck-up substrate member having the periphery tangential to the inner circumferential face of the cylindrical suck-up substrate member.

7. A method according to claim 1, including alternately piling flat or corrugated foils having a binder liquid rise-blocking material coated at a predetermined position with corrugated or flat foils, and winding or laminating the piled foils to form a honeycomb body.

8. A method according to claim 7, wherein the binder liquid rise-blocking material is composed of an oil and fat or a solid paraffin.

9. A method according to claim 1, wherein flat plates and corrugated plates are alternately piled and the piled plates are wound or laminated to form a honeycomb body.

* * * * *